Oct. 19, 1937.                S. BLICKMAN                2,095,964
                        APPARATUS FOR USE IN WELDING
                         Filed May 29, 1934          5 Sheets-Sheet 2
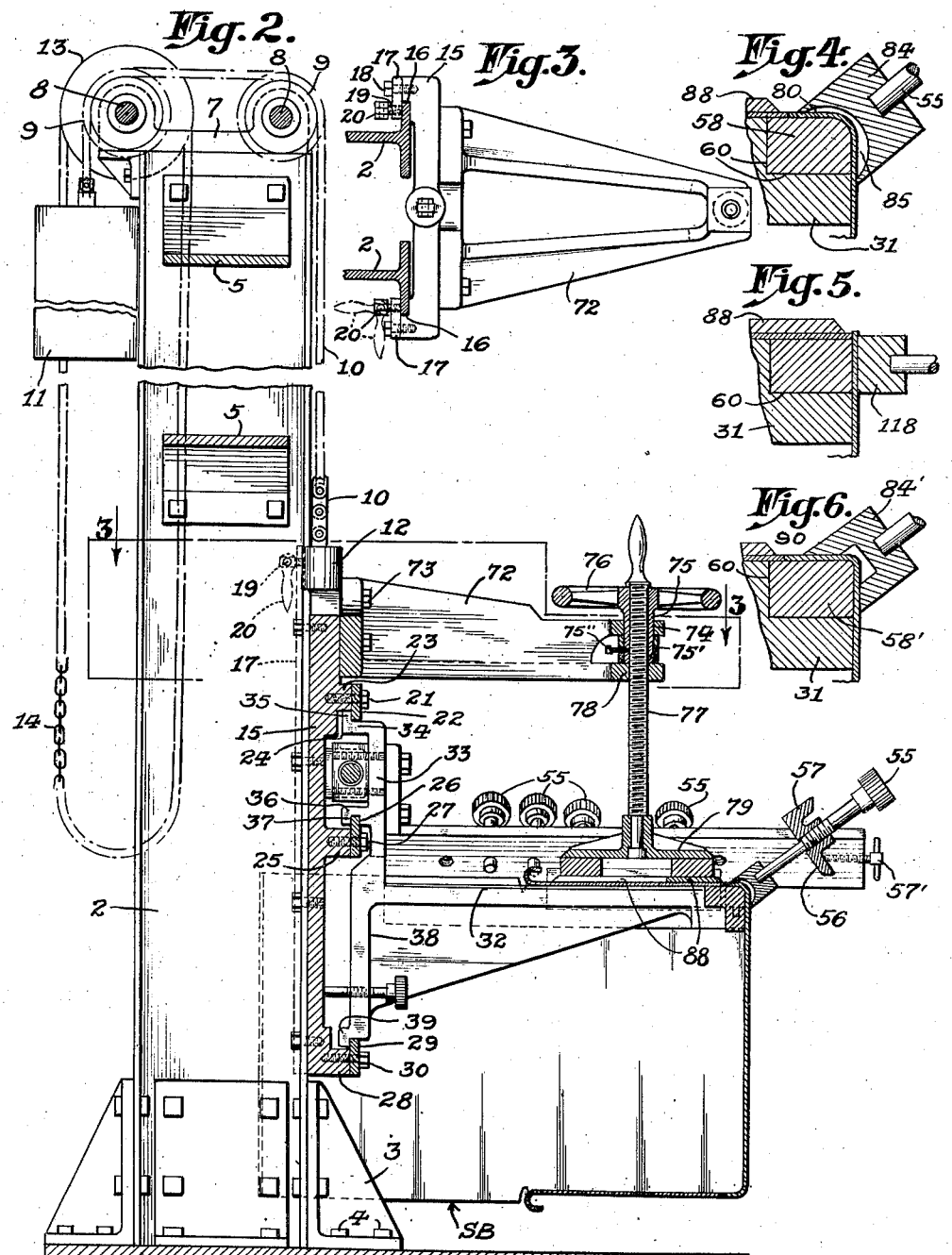

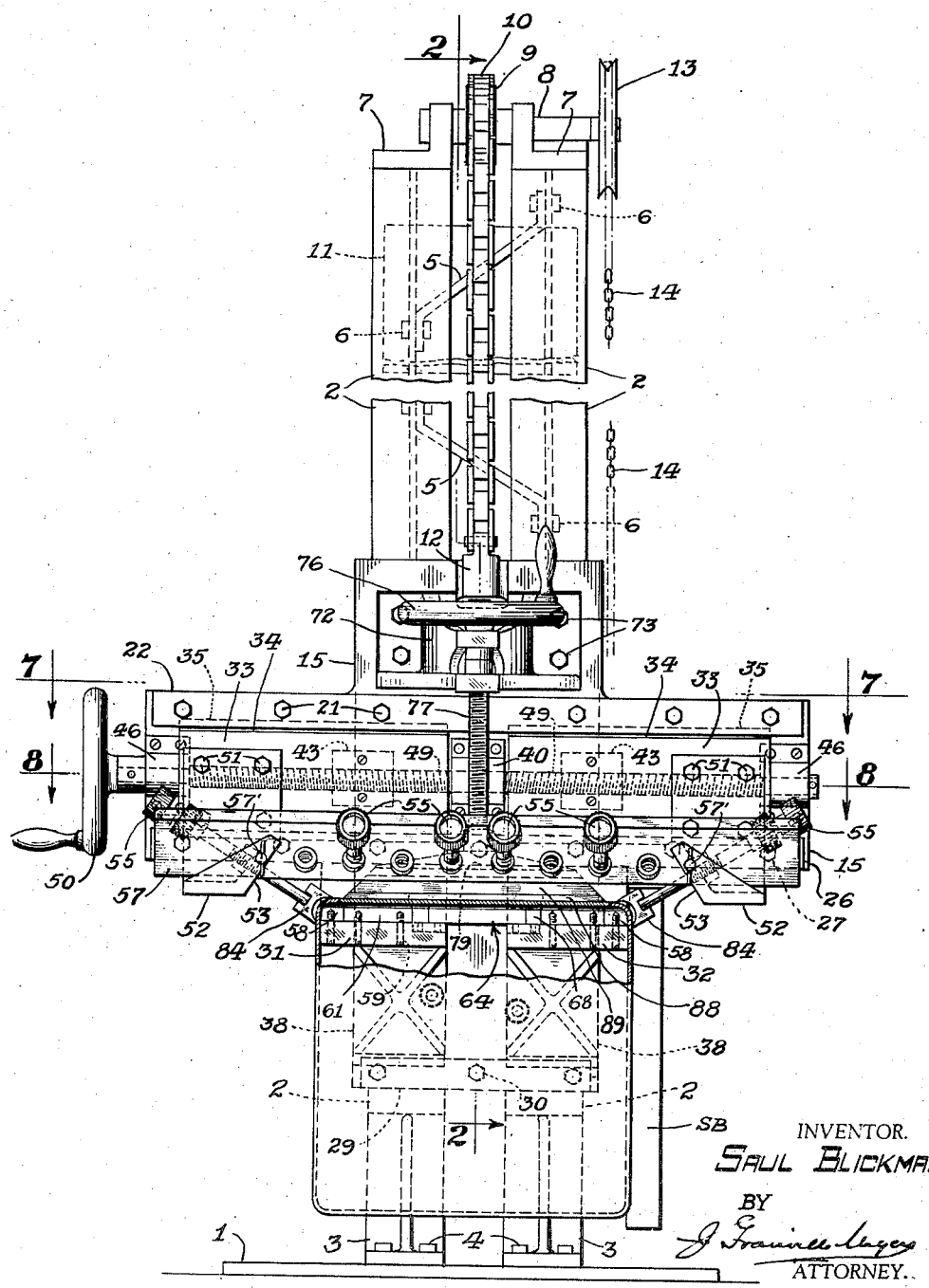

Oct. 19, 1937.   S. BLICKMAN   2,095,964
APPARATUS FOR USE IN WELDING
Filed May 29, 1934   5 Sheets-Sheet 3
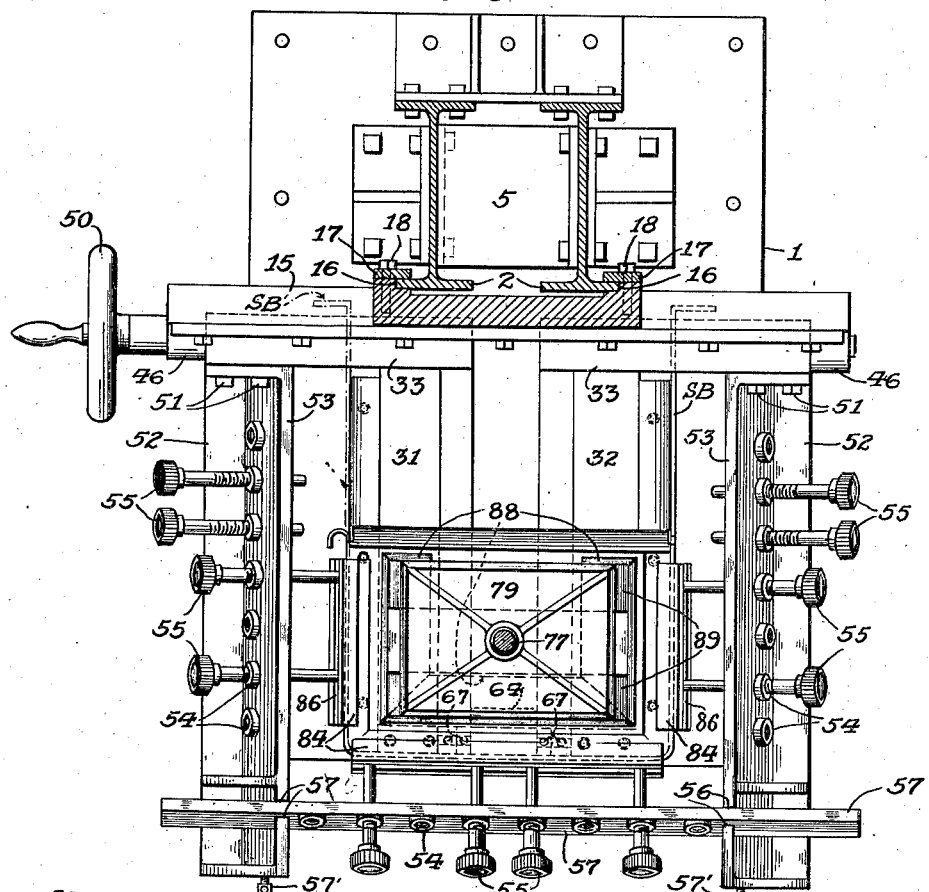
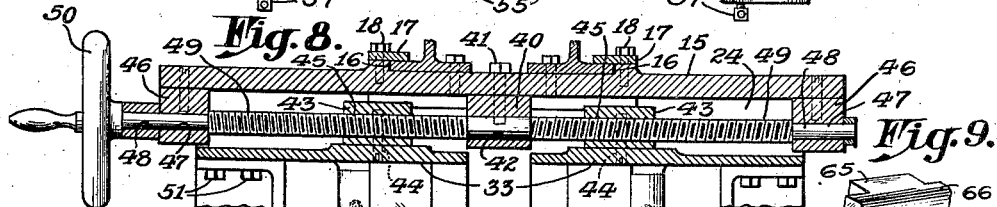
INVENTOR.
SAUL BLICKMAN
BY
ATTORNEY.

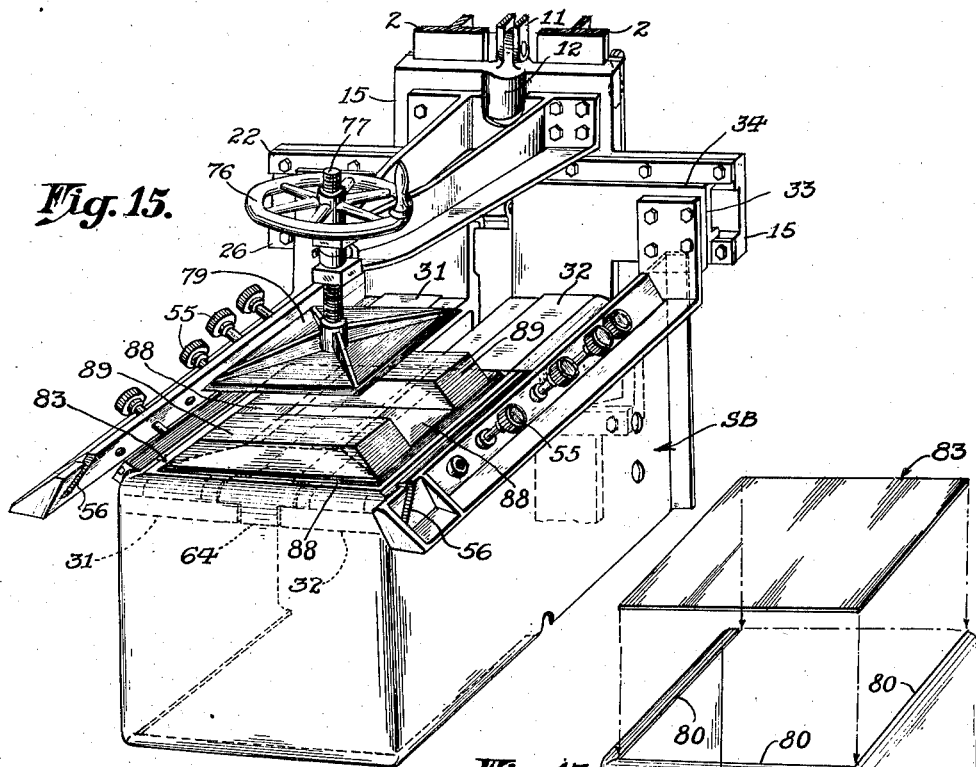
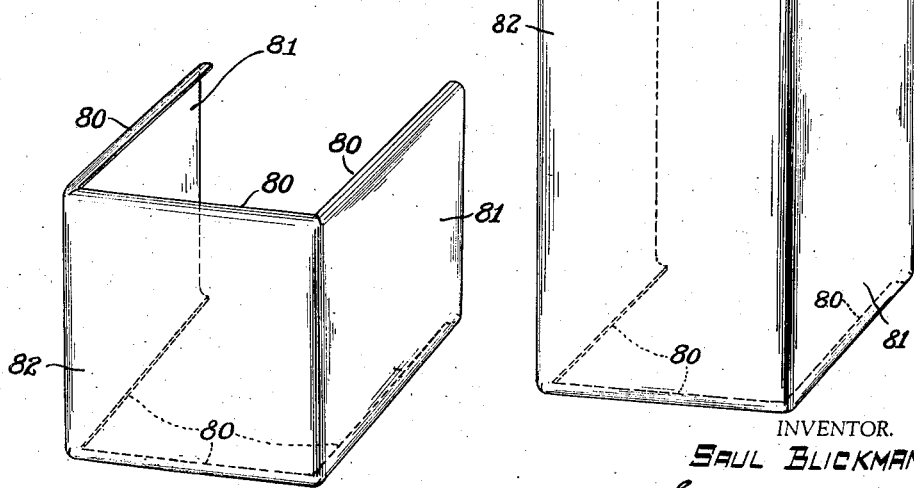

Oct. 19, 1937.  S. BLICKMAN  2,095,964
APPARATUS FOR USE IN WELDING
Filed May 29, 1934   5 Sheets-Sheet 5
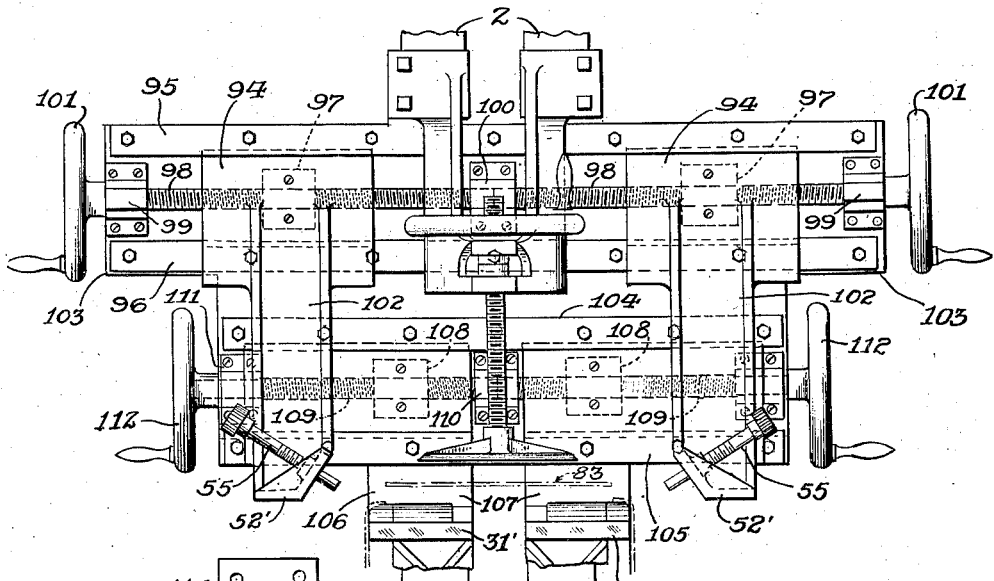
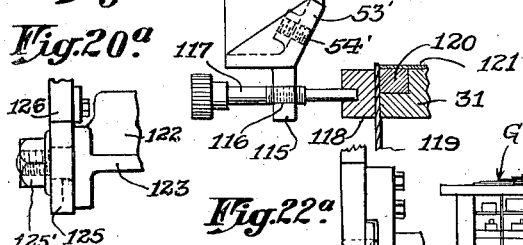
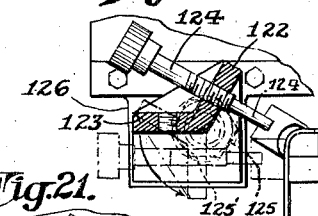
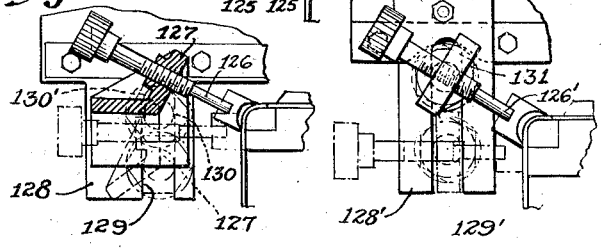
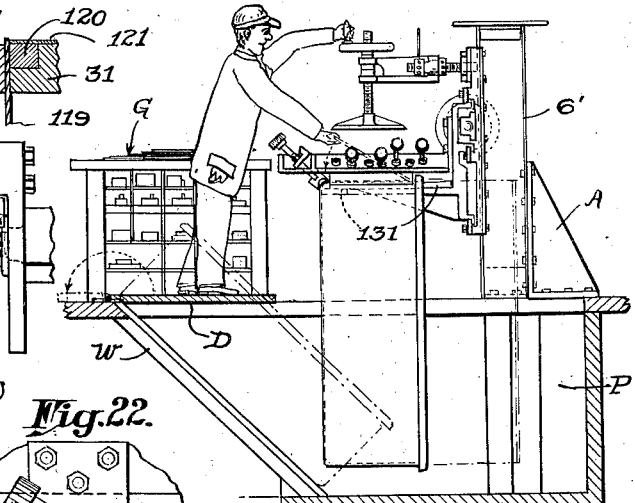
INVENTOR.
SAUL BLICKMAN
BY
ATTORNEY.

Patented Oct. 19, 1937

2,095,964

UNITED STATES PATENT OFFICE 2,095,964

APPARATUS FOR USE IN WELDING

Saul Blickman, New York, N. Y.

Application May 29, 1934, Serial No. 728,191

12 Claims. (Cl. 113—99)

My present invention relates to apparatus for use in welding sheet metal articles, such, for example, as disclosed in my copending application, Serial No. 624,839, filed July 26, 1932, or similar articles wherein certain parts are united by welding to form homogeneous structures, which has now issued as Letters Patent 1,974,794, dated September 25, 1934.

In my said copending application, I have disclosed a sheet metal sink including a bottom and four walls, two of the said walls being united to curved marginal portions of other walls and the bottom by welding to form a homogeneous structure composed of a bottom and four walls having rounded corners. In the welding of such structures, it is important to have the parts which are to be united by the welding accurately positioned relative to each other, and held during the welding operation. The means generally in use prior to my present invention for assembling the parts and holding them in proper relative positions for the welding operation, required considerable time and effort to accomplish the relative positioning and clamping of the parts.

My present invention provides apparatus designed with a view, proven in actual practice, to greatly facilitate the relative positioning of parts to be united by welding, and means quickly and easily operable to firmly hold the parts during the welding operation in a manner and position not only convenient to the welder for his work, but also conducive to the provision of neat joints where the welding is done.

While my said copending application, Serial No. 624,839, discloses rounded corner sink structures, the present invention provides apparatus which may be used in forming such structures and which is readily adaptable to use also with square or sharp cornered sinks or structures, as will be hereinafter pointed out in detail.

Another object of the present invention is to make the apparatus forming the subject matter thereof readily adaptable or adjustable for use with structures of various dimensions.

The foregoing and all of the objects and advantages of the invention will become more apparent and will be pointed out during the course of the following detailed description of the accompanying drawings, in which Fig. 1 is a front elevation of one form of apparatus embodying my invention, showing a sink positioned thereon and partly broken away;

Fig. 2 is a view taken on the line 2—2 of Fig. 1;

Fig. 3 is a view taken on the lines 3—3 of Fig. 2;

Fig. 4 is an enlarged fragmentary sectional view of a portion of the clamping and holding means for the rounded corner of a sink;

Fig. 5 is a view similar to Fig. 4 showing a modification in the clamping and holding means for a square cornered sink;

Fig. 6 is a view similar to Fig. 4 showing another modification in the clamping and holding means for a different type of square cornered sink;

Fig. 7 is a view taken on the line 7—7 of Fig. 1;

Fig. 8 is a view taken on the line 8—8 of Fig. 1 with parts broken away and removed;

Figs. 9–14 are perspective views of elements used in supporting and clamping the parts in position for welding;

Fig. 15 is a perspective view of a sink in position on its support, and portions of the clamping means to hold the sink and part to be welded thereon in proper relative position;

Fig. 16 is a perspective view of a blank which has been formed up to receive a part to be welded thereto;

Fig. 17 is an exploded perspective view similar to Fig. 16 showing a formed up blank of larger dimensions and the part to be welded thereto;

Fig. 18 is a view similar to Fig. 1 showing a modification of the invention;

Figs. 19–22 are fragmentary enlarged detailed views showing modifications in the clamping means; and Fig. 23 is a side elevation partly in section of another modification.

Referring to Figs. 1–3, the numeral 1 designates a base plate on which stand the I-beams 2, and which are secured to the base by angle brackets 3 and bolts 4. Adjacent their upper ends the I-beams are held in fixed spaced relation by cross plates 5 secured therebetween by bolts and nuts 6. On top of the I-beams are secured brackets 7 through which are journaled a pair of shafts 8 each carrying a sprocket wheel 9 across which the chain 10 secured to a weight 11 at the rear of the I-beams, and at its other end to a coupling 12 which is also connected, as presently described, with the apparatus forming the principal subject matter of my present invention. A pulley 13 is secured to one of the shafts 8 and the chain 14 is around the pulley, so that by pulling on chain 14 the pulley may be rotated in either direction to turn the shaft 8 to which it is connected and consequently the sprocket wheels and chain 10 to raise and lower the weight 11 and consequently the apparatus on which the structures to be welded is mounted.

The mechanism just described for the raising and lowering of the apparatus is not essential to the invention, but may be desirable for adapting the apparatus to use with structures of various lengths.

The coupling 12 may be formed as a part of or be rigidly connected to a carrier or plate 15, which is notched, as shown clearly in Figs. 3 and 7, at 16, to receive the edges of the I-beams 2. Plates 17 are secured by bolts 18 to the rear of the carrier or frame 15 overlapping a portion of the I-beams, to slidably secure the carrier to the beams so that it may be raised or lowered when the pulley 13 is rotated as previously described. A locking screw 19 having a swingable handle 20 may be provided to lock the frame at desired positions on the I-beams.

Referring still to Figs. 1–3, and also to Figs. 7 and 8, it will be noted that the carrier or plate 15 has secured across its front, by bolts 21 a plate 22, the lower end of which extends down below a rib 23 formed as a part of the plate 15, and slightly over a recess 24 in the plate 15. A similar rib 25 is provided at the lower end of the recess on the plate 15, and another plate 26 is secured to the rib 25 by bolts 27. The lower end of the plate 15 is also provided with a rib 28 similar to the ribs 23 and 25, and there is secured thereacross a plate 29 by bolts 30. A pair of table-like supports 31 and 32 (Figs. 7 and 8) have upstanding flanges 33, see Fig. 2, the upper ends of which extend inwardly as at 34 and are bent upwardly at 35 behind the plate 22. The flanges 33 are also provided with inwardly extending ribs 36 provided with grooves 37 receiving the upper ends of the plate 26. The supports 31 and 32 also have a depending flange 38, the lower end of which extends inwardly and then downwardly as at 39 being disposed behind the plate 29 and also resting thereon. Thus the table-like supports are slidably supported for movement toward and away from each other.

A block 40 (Fig. 8) is secured by bolts 41 to the frame or plate 15 within the recess 24, and is provided with a central unthreaded bore 42. Blocks 43 are secured within the recess 24 to the flanges 33 of the supports 31 and 32 as by bolts 44, and are each provided with a screw threaded bore 45, the threads in the blocks 43 being respectively right and left hand. Also secured to the outer ends of the plate 15 are blocks 46 also provided with plain bores 47. A shaft 48 has plain portions journaled in the blocks 40 and 46, and intermediate the said blocks has screw threaded portions 49, also left and right handed, on opposite sides of the block 40 and engaging the threads in the blocks 43. A hand wheel 50 is keyed to one end of the shaft 48 to rotate therewith, so that the supports 31 and 32 will be moved either toward or away from each other according to the direction of rotation of the shaft 48.

The outer ends of the flanges 33 have secured thereto as by bolts 51, elongated plates 52, spaced from and parallel to the sides of the supports 31 and 32, as shown clearly in Figs. 1 and 7. The plates 52 have an inclined wall 53 provided with a plurality of screw threaded bosses or openings 54 which receive screws 55, which preferably are provided with a considerable unthreaded area and which are disposed at an angle of inclination toward the top side edges of the supports 31 and 32. The screws may be moved toward the supports 31 and 32 a relatively great distance without turning, due to the unthreaded lower portion, and then when the threads on the screws engage with the threads in the bosses or openings 54, the screws may be turned to move them further down toward the supports or upwardly therefrom. It will be understood, of course, that the plates 52 move with the supports 31 and 32 when the shaft 48 is rotated. The outer ends of the inclined walls 53 are provided with alined notches 56 which receive another plate 57, also inclined toward the front of the supports 31 and 32 when positioned in the notches 56. The plate 57 also is provided with screw threaded bosses 54 and screws 55 inclined toward the top front edges of the supports 31 and 32. Screws 57' firmly hold the plate 57 in the notches.

In Figs. 4 and 8, the side top edges of the supports 31 and 32 are shown provided with round cornered inserts or strips 58 which may be held in place by screws 59 when the inserts are in the notches 60 in the said edges of the supports. Similarly the front edges are provided with inserts 61 which abut at one end the inserts 58 and terminate at their other ends short of the confronting sides of the supports 31 and 32, so that portions 62 of the notches in the front edge of the supports are exposed. These notches are provided with grooves 63 in their bottoms. Assuming that with the supports in the position shown in Fig. 8 they will nicely receive, as hereinafter explained in detail, a structure of given width, the space between the supports 31 and 32 at the front edge thereof is filled by a center backing block, such as shown in Fig. 9 and designated generally by the numeral 64. This block has a rear extension 65 which fits between the supports 31 and 32, as shown in dotted lines in Fig. 8, and has lateral extensions 66 each provided with the depending pin 67 to fit in the grooves 63, the extensions 66 filling a part of the exposed portion 62 of the notches in the front upper edge of the support. The remainder of the exposed portions may be filled by blocks 68, such as shown in Fig. 14, each having a pin 69 to engage in the grooves 63. Thus the front edge of the supports and the space therebetween would be completely filled.

On the other hand, if the supports were completely together, then the exposed portions 62 of the notches could be filled by a block, such as shown in Fig. 13 and designated by the numeral 70 also having depending pins 71. Since the structures to be assembled on the apparatus are usually of standard dimensions, the blocks such as shown in Fig. 9, may be of various dimensions to close the space between the supports 31 and 32 according to the position thereof and the width of the structure to be received thereon.

Referring again to Figs. 1–3, it will be seen that a yoke or bracket 72 is secured by bolts 73 to the frame 15 above the flanges 33 of the supports 31 and 32. The outer end of this bracket or yoke is bifurcated as shown in Fig. 2, and the upper portion thereof is provided with a plain bore 74 which receives the shank 75 of a hand wheel 76. A screw threaded shaft 77 is mounted through the shank 75, and has screw threaded engagement with threads in the bore of the shank 75. The shank 75 is connected to a collar 75' by set screws 75'' to hold the shank in place. The shaft 77 also extends through an opening 78 in the lower portion of the end of the yoke 72 and carries at its lower end a plate 79. Obviously rotation of the wheel 76 will cause the shaft 77 and the plate 79 to be raised or lowered in the same manner as in the case of usual hand presses. The plate 79 is located directly above the supports 31 and 32.

Referring for the moment to Figs. 16 and 17, it will be noted that I have shown formed up blanks similar to those disclosed in Fig. 8 of my copending application, Serial No. 624,839, having inwardly curved marginal portions 80 to form rounded corners of the sink. The numeral 81 in these views designates the front and back walls of the sink, and the numeral 82 the bottom. To complete the sink by uniting the side walls to the marginal portions 80, plates 83 which fit between the edges of the marginal portions 80 must be arranged with their edges in alinement with the edges of the marginal portions 80 and supported in such position during welding. One of the plates 83 is shown in Fig. 17 above the formed up blank.

In Figs. 1, 2, 7 and 15, I have shown the formed up blank arranged on the supports 31 and 32 with the marginal portions 80 supported by the inserts 58, 61 and block 64, it being understood that the curvature of the edges of the inserts and blocks is the same as the curvature of the marginal portions 80. Furthermore, the supports 31 and 32 are positioned so that the distance between their outer edges is substantially the same as the distance between the walls 81 of the sink or other structure. With the blank so supported, the edges of the marginal portions 80 are disposed on top of the supports 31, 32, adjacent the edges thereof. To hold the blank firmly on the support with the said marginal portions clamped against the rounded corners of the support, I provide blocks of different lengths, one of which is shown in Fig. 10 and having an arcuate face 85 corresponding substantially, but preferably not exactly, to the curvature of the arcuate portions, and on the opposite face a groove 86. These blocks 84 are mounted, as shown in Figs, 1, 2, 4 and 7, at substantially the same inclination as the screws 55, so that the lower ends of the screws may engage in the slots 86, and when the screws are tightened they force the blocks 84 against the marginal portions 80 of the blank. It will be noted that one of the edges of the plates 84 along the groove 85 is disposed substantially close to the end of the marginal portion 80. The plate 83, which is to be welded to the marginal portions, may be placed on top of the supports 31 and 32 with its edges adjacent the edges of the marginal portions either before or after the clamping plates 84 are applied and tightened against the marginal portions. When the plate 83 is laid on top of the supports 31 and 32 with its edges adjacent the edges of the marginal portions 80, miter plates 88 such as shown in Fig. 12 are positioned on top of the plate 83, as shown in Fig. 15. Blocks 89, such as shown in Fig. 11 and having beveled ends, are then placed on top of the miter plates 88, also as shown in Fig. 15 and Fig. 2. The wheel 76 is then rotated to force the plate 79 tightly down on top of the blocks 89, so that the plate 83 and the marginal portions 80 have their edges abutting or confronting and held firmly in such position for the welding. The usual welding torch is then brought into action and the flame is applied between the edges of the miter plates and the blocks 84. When the plate 83 has been welded in place, the clamping means are loosened and the blocks removed, so that the structure may be reversed on the supports 31 and 32 to weld in the other side plate in the manner just described.

In Fig. 17, I have shown the plate 83 without a rim, whereas in Fig. 2 I have shown the same with the rim and also with a splash-back SB which extends beyond the rim. This, of course, is similar to the sink shown in my said copending application, Serial No. 624,839, and regardless of the depth of the sink or the length of the splash-back, the structure may be held on the apparatus disclosed with the splash-back extending back beside the I-beams 2. This is shown in Figs. 2 and 15.

I have also shown in Figs. 1 to 15, a relatively short sink applied to the apparatus, whereas a sink of considerable length three or four times that shown in Fig. 16 may have to have the ends welded in. In such event, I would raise the frame 15 to carry the yoke 72, plates 52, and supports 31 and 32 upwardly sufficiently from the floor to permit the relatively long structure to be placed on the supports 31, 32. The welder in such case may work from a ladder or elevated platform.

As will be seen by reference to Fig. 6, I have shown a strip 58', similar to the strip 58, fitting in the notch 60 of the supports, the difference being that the strip 58' is provided with a sharp corner instead of a rounded corner, otherwise the manner of mounting the structure to be welded on the supports, and welding it, is the same in Fig. 6, as previously described. However, where the sharp cornered sinks are to be welded on the apparatus, the screws 59 would be loosened to permit removal of the strips 58 and substitution of strips 58'. Similarly the pieces 61 and filling blocks, such as shown in Figs. 9, 13 and 14, would have sharp instead of rounded corners. The clamping block for holding the sharp cornered sink would preferably be as shown in Fig. 6, substantially the same as block 84 except that the block of Fig. 4, designated by the numeral 84' would have beveled flat edges 90 to engage the marginal portions and the sides of the structure.

In Fig. 18 I have shown a modification of the invention, wherein separate means is provided for moving the plates which carry the clamping screws and the table-like supports. I have further provided in the modification, means whereby each of the table-like supports and each of the side plates which carry the clamping screws may be moved individually. To this end, plates 94, similar to plates 33, are slidably mounted with respect to supporting plates 95, 96, generally similar to plates 22 and 26 previously described. Each of the plates 94 carries a block 97 having a threaded bore through which runs the screw threaded shaft 98 journaled at its ends through blocks 99 and 100 and having an operating wheel 101 attached to its outer end. Each of the shafts 98 and the blocks 97 are oppositely threaded, so that the plates 52' which support the clamping screws may be moved individually toward and away from each other. The plates 52' are supported by a downward extension 102 on the plates 94. A plate 103 generally similar to frame 15 also has attached thereto plates 104 and 105, similar to plates 95 and 96. The supporting tables 31', 32' have upward extensions 106, 107 respectively, each carrying blocks 108 and each slidably mounted on the plates 104, 105, similar to the plates 94. Screw threaded shafts 109 are mounted through the blocks 108 and are journaled at their ends in blocks 110, 111, and have operating wheels 112 secured to their outer ends. Obviously rotation of either or both of the wheels will move the supports 31' and 32' toward or away from each other or move one with respect to the other. The use of the apparatus shown in Fig. 18 would be the same as described in connection with that shown in Figs. 1-15 except for the individual adjustment of the plates carrying the clamping screws and the individual adjustment of the supports 31', 32', for the structure to be welded.

In Fig. 19, I have shown a further modification of the invention in respect to the plates which carry the clamping screws. In Fig. 19 such plate is designated by the numeral 114 and, of course, is generally similar to the plates 52, 52' having the inclined wall 53' with the threaded opening 54' but being provided with a depending rib 115 having screw threaded openings 116 to receive the screws 117 similar to screws 55. Such screws may be removed from the openings 116 and used in the openings 54'. In Fig. 19 and in Fig. 5, I have shown a different type of welded joint in respect to a sharp or square cornered structure. In such structure the block 118 is engaged by the screws to force one wall or plate 119 of the structure against the support 31 or 32. The rounded corner strips 58 are replaced by square cornered strips 120 generally similar to the strips 58'. The other part of the structure to be welded to the part 119 and designated by the numeral 121 is placed on top of the strip and of course is clamped down by a plate similar to that of 79 of Fig. 2. The screw 117 is arranged at right angles to the plate 119 and compresses the block 118 directly against one surface thereof in holding the said plate against the plate 121 in the manner shown, so that the welding can be done along the lines where the plates abut.

In Figs. 20-22, I have shown further modifications in the mounting for the plates which hold the clamping screws. In Figs. 20 and 20a the plate includes an inclined wall 122 similar to the wall 53 and the horizontal portion 123, each being provided with screw threaded openings to receive the clamping screws 124. The ends of the plates may be provided with a stud 125 extending through the support 126 and secured by nut 125' at the rear of the supporting plate 126. If the nut is loosened, the plate may be turned on its stud to the dotted line position of Fig. 20 from the full line position, so that the screws 124 can be arranged through the openings in the normally horizontal wall to be at right angles to the side of the structure held on the supports instead of at an inclination. Of course the full line position would be for welding joints of the type shown in Figs. 4 and 6, and the dotted line position would be for welding joints of the type shown in Figs. 5 and 19.

In Fig. 21 the wall 127 of the plate is similar to wall 122 and has the screw threaded openings therethrough. The fixed or supporting part 128 is provided with a slot 129 through which the stud 130 is disposed to receive a nut 130' similar to the nut 125' in Fig. 20a to clamp the parts in desired positions. In the full line position the stud is at the top of the slot and the clamping screws are arranged at an inclination to the corner of the structure to be welded, whereas in the dotted line position, the bolt is in the lower end of the slot, and the wall 127 is substantially upright so that the clamping screws are arranged at right angles to the side wall of the structure being welded.

The arrangement in Figs. 22 and 22a is substantially the same as in Fig. 21 exept that the plate 131, which may be of any cross-sectional shape, has no horizontal portion. Otherwise the parts of Fig. 22 bearing the primed numerals are the same as the unprimed parts of Fig. 21.

In Fig. 23, I have shown a modification in the means for supporting on the apparatus such as previously described herein, sinks or similar structures of different lengths, so that it is not necessary to move the table-like supports up and down by apparatus such as shown and described in connection with Fig. 1. The beams 6' in Fig. 23 are supported above a pit P by angle brackets A. The front of the pit has an inclined wall W above which is a door or platform D on which the welder may stand. The sinks whether long or short may be supported in the usual manner when clamped on the apparatus. In Fig. 23, as shown in dotted lines, the relatively long sink is resting on the inclined wall W from which position it may be straightened to engage over the supports 131 of the apparatus, similar to supports 31 and 32 previously described, to be clamped with the bottom of the sink structure disposed in the pit. Obviously this arrangement is adapted for use with sinks of various lengths whether long or short, and obviates the use of separate apparatus for elevating or lowering the supports and clamping mechanism. If desired a cabinet G may be provided convenient to the welder to contain the different sized miter blocks, clamping plates, filler blocks, etc.

I claim:

1. Apparatus for use in welding together the walls of hollow metal structures, wherein a part of the body of the structure is formed up to provide opposite walls and a connecting wall each provided with marginal portions, comprising a support composed of a pair of similar members, a pair of plates at opposite sides of said members and in spaced relation thereto, means to collectively move the said members and plates toward and away from each other, means carried by said plates to clamp the marginal portions of said walls of the structure against the said members, and means to fill the space between said members when they are separated to present a complete front edge for one of the marginal portions.

2. Apparatus for use in welding together the walls of hollow metal structures, wherein a part of the body of the structure is formed up to provide opposite walls and a connecting wall each provided with marginal portions, comprising a support composed of a pair of similar members, a pair of plates at opposite sides of said members and in spaced relation thereto, means to collectively move the said members and plates toward and away from each other, means carried by said plates to clamp the marginal portions of said walls of the structure against the edges of said members, the edges of said members being formed by interchangeable strips conforming to the approximate shape and size of the marginal portions of different types of structures.

3. Apparatus for use in welding together the walls of hollow metal structures, wherein a part of the body of the structure is formed up to provide opposite walls and a connecting wall each provided with marginal portions, comprising a support composed of a pair of similar members, a pair of plates at opposite sides of said members and in spaced relation thereto, means to collectively move the said members and plates toward and away from each other, means carried by said plates to clamp the marginal portions of said walls of the structure against the edges of said members, and means above said members to clamp the wall which is to be joined to said marginal portions on said members with its edges in proximity to the edges of the marginal portions.

4. Apparatus for use in welding together the walls of hollow metal structures, wherein a part of the body of the structure is formed up to provide opposite walls and a connecting wall each provided with marginal portions, comprising a support composed of a pair of similar members, a pair of plates at opposite sides of said members and in spaced relation thereto, means to independently move the said members and plates toward and away from each other, means carried by said plates to clamp the marginal portions of said walls of the structure against the said members, and means to fill the space between said members when they are separated to present a complete front edge for one of the marginal portions.

5. Apparatus for use in welding together the walls of hollow metal structures, wherein a part of the body of the structure is formed to provide opposite walls and a connecting wall each provided with marginal portions, comprising a support composed of a pair of similar members, a pair of plates at opposite sides of said members and in spaced relation thereto, means to independently move the said members and plates toward and away from each other, means carried by said plates to clamp the marginal portions of said walls of the structure against the edges of said members, the edges of said members being formed by a strip conforming to the approximate shape and size of one of the marginal portions.

6. The structure of claim 3 wherein the means to collectively move the said members and plates toward and away from each other comprises a screw threaded shaft having at opposite ends thereof right and left-handed screw threads, respectively, parts connected to said members and plates engaging said screw threads, and a member for turning said screw threaded shaft.

7. Apparatus for use in welding together the walls of hollow metal structures, wherein a part of the body of the structure is formed to provide opposite walls and a connecting wall, each provided with marginal portions, comprising a support composed of similar members, a pair of plates at opposite sides of said members and in spaced relation thereto, means to collectively move the said members and plates toward and away from each other, means consisting of clamping screws, each having a long unthreaded section carried by said plates to clamp the marginal portions of said plates of the structure against the said members of the support, and means to fill the space between said members when they are separated to present a complete front edge for one of the marginal portions.

8. Apparatus for use in welding together the walls of hollow metal structures, wherein a part of the body of the structure is formed to provide opposite walls and a connecting wall, comprising a support composed of a pair of similar members, a pair of plates at opposite sides of said members and in spaced relation thereto, means to collectively move the said members and plates relatively to each other, means carried by said plates and consisting essentially of clamping screws to clamp the marginal portions of the walls of the structure against the said members, means to fill the space between said members when they are separated to present a complete front edge for one of the marginal portions, and means above the said support to clamp the wall of the structure which is to be joined to said marginal portions on said support, with its edges in proximity to the edges of the marginal portions.

9. The structure of claim 1, wherein the means to collectively move the said members and plates relatively to each other comprises a screw threaded shaft having at opposite ends thereof right and left hand screw threads respectively, parts connected to said members and plates engaging said screw threads, and means for revolving said screw threaded shaft.

10. The combination of claim 2, wherein the means to collectively move the said members and plates toward and away from each other comprises a rotary threaded shaft having at opposite ends thereof right and left hand screw threads respectively, parts connected to said members and plates that engage said screw threads, and means for turning said screw threaded shaft.

11. The combination of elements as recited in claim 2, with the added element consisting of means above the support to clamp the wall of the structure which is to be joined to the marginal portions on said support, with its edges in proximity to the edges of the marginal portions.

12. Apparatus for use in welding together the walls of hollow metal structures, wherein a part of the body is formed to provide opposite walls and a connecting wall, each having marginal portions, comprising a support composed of a pair of similar members, a pair of inclined plates at opposite sides of said members, means to independently move the said plates and members relatively to each other, means carried by the plates and consisting of inclined screws operable upon the edges of the structure on the support to clamp the marginal portions of the walls of the structure against the support, means to fill the space between the members to present a complete front edge for the marginal portions, and means above the support to clamp the wall to be joined to the marginal portions of the structure on the support, and a member for actuating said upper means.

SAUL BLICKMAN.